(12) United States Patent
Ishikawa

(10) Patent No.: US 6,612,639 B2
(45) Date of Patent: Sep. 2, 2003

(54) SIDE DOOR STRUCTURE FOR VEHICLE

(75) Inventor: Mamoru Ishikawa, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/126,996

(22) Filed: Apr. 22, 2002

(65) Prior Publication Data

US 2002/0153742 A1 Oct. 24, 2002

(30) Foreign Application Priority Data

Apr. 23, 2001 (JP) ........................................ 2001-124335

(51) Int. Cl.$^7$ ................................................ B60J 5/04
(52) U.S. Cl. ................................ 296/146.6; 296/146.5; 296/146.9; 296/188; 49/502
(58) Field of Search ...................... 296/146.1, 146.5, 296/146.6, 146.9, 187, 188, 189; 49/502

(56) References Cited

U.S. PATENT DOCUMENTS

| | | | | |
|---|---|---|---|---|
| 4,800,638 A | * | 1/1989 | Hrringshaw et al. | |
| 5,033,593 A | | 7/1991 | Kazuhito | |
| 5,137,325 A | * | 8/1992 | Ohya | 296/188 |
| 5,364,157 A | | 11/1994 | Siedlecki | |
| 5,417,470 A | * | 5/1995 | Holt | 296/188 |
| 5,429,410 A | * | 7/1995 | Fleischer | 296/146.6 |
| 5,466,032 A | * | 11/1995 | Clausen et al. | 296/188 |
| 5,470,125 A | * | 11/1995 | Yamazaki | 296/146.6 |
| 5,573,297 A | * | 11/1996 | DeRees et al. | 296/146.6 |
| 5,577,794 A | | 11/1996 | Gandhi et al. | |
| 5,599,057 A | * | 2/1997 | Hirahara et al. | 296/146.6 |
| 5,707,098 A | | 1/1998 | Uchida et al. | |
| 5,743,588 A | * | 4/1998 | Ufrecht | 296/146.6 |
| 5,762,394 A | * | 6/1998 | Salmonowicz et al. | 296/146.5 |
| 2002/0036414 A1 | * | 3/2002 | Nozaki et al. | 296/146.9 |

FOREIGN PATENT DOCUMENTS

| | | | | |
|---|---|---|---|---|
| EP | 0 788 912 A1 | | 8/1997 | |
| JP | 4-27619 | * | 1/1992 | 296/146.4 |
| JP | 4-81322 | * | 3/1992 | 296/146.4 |
| JP | 5-42825 | * | 2/1993 | 296/146.6 |
| JP | 5-178089 | * | 7/1993 | 296/146.5 |
| JP | 5-229343 | * | 9/1993 | 296/146.9 |
| JP | 5-286364 | * | 11/1993 | 296/146.6 |
| JP | 5-301522 | * | 11/1993 | 296/146.6 |
| JP | 5-319092 | * | 12/1993 | 296/146.6 |
| JP | 6-55938 | * | 3/1994 | 296/146.5 |
| JP | 6-72152 | * | 3/1994 | 296/146.6 |
| JP | 6-191276 | * | 7/1994 | 296/146.6 |
| JP | 06255365 A | | 9/1994 | |
| JP | 09086178 A | | 3/1997 | |

OTHER PUBLICATIONS

European Search Report, dated Jul. 30, 2002, for European Patent Application No. 02252789, 2 pages.

* cited by examiner

*Primary Examiner*—D. Glenn Dayoan
*Assistant Examiner*—H. Gutman
(74) *Attorney, Agent, or Firm*—Smith, Gambrell & Russell, LLP

(57) ABSTRACT

A side door structure for a vehicle is composed of a main body and a rear side reinforcement member provided in the main body. The main body is formed by an inner panel and an outer panel connected to the inner panel. The rear side reinforcement member connects the inner panel and the outer panel in the main body, and the rear side reinforcement member forms a rigid part with a closed hollow cross section at a rear part of the main body by cooperation with the inner panel and the outer panel.

18 Claims, 9 Drawing Sheets

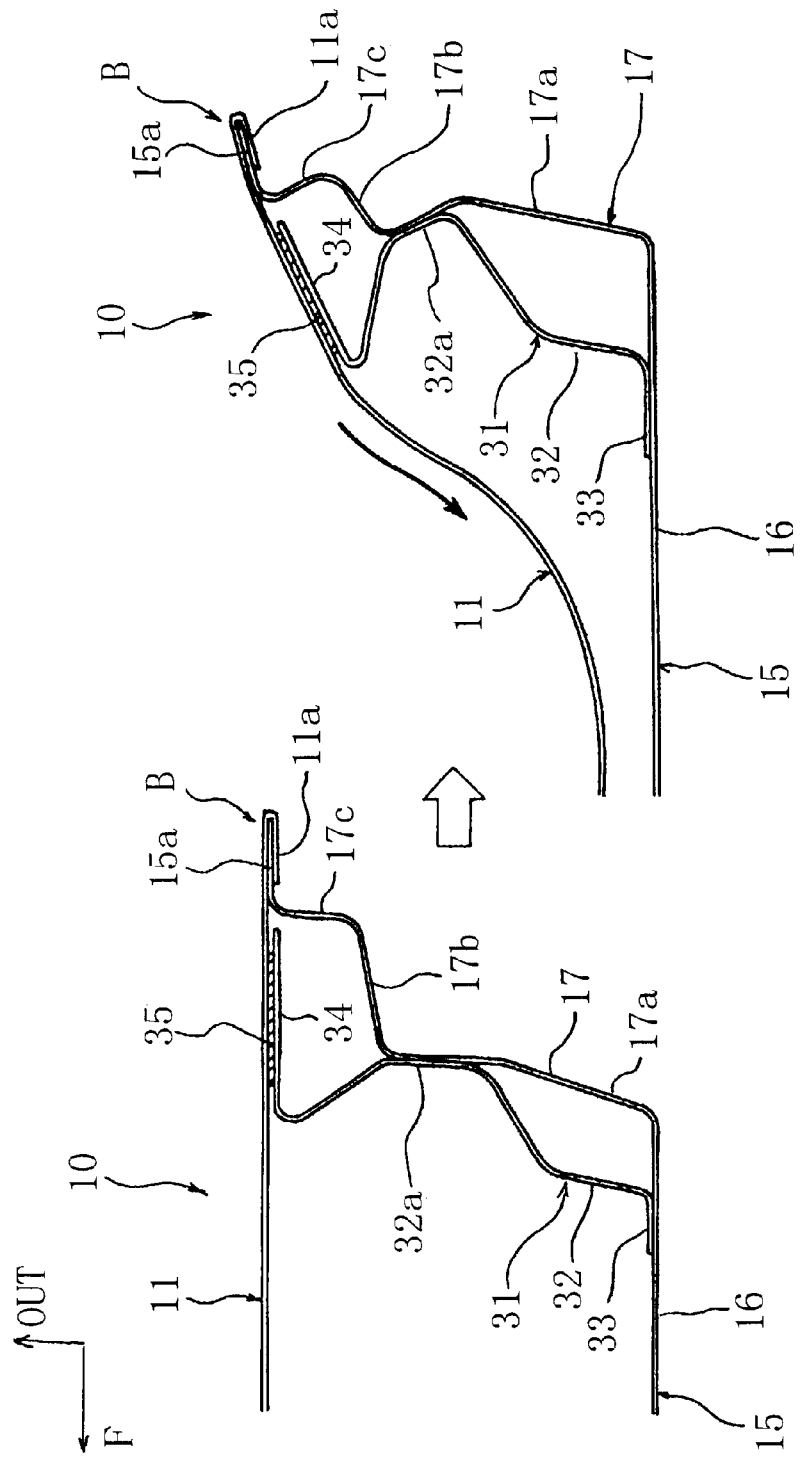

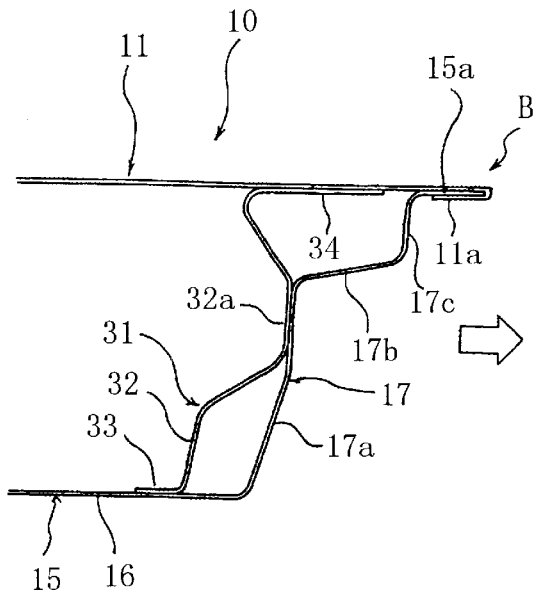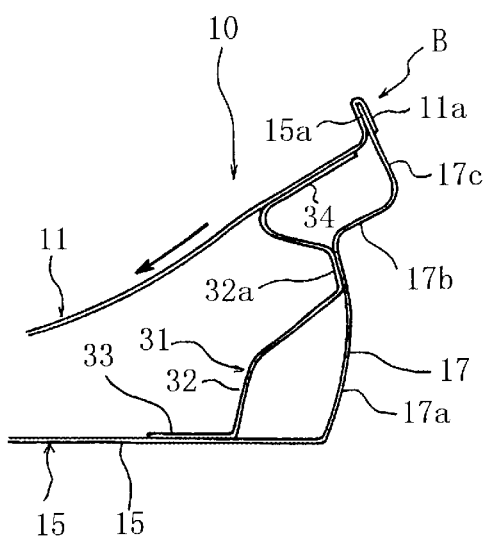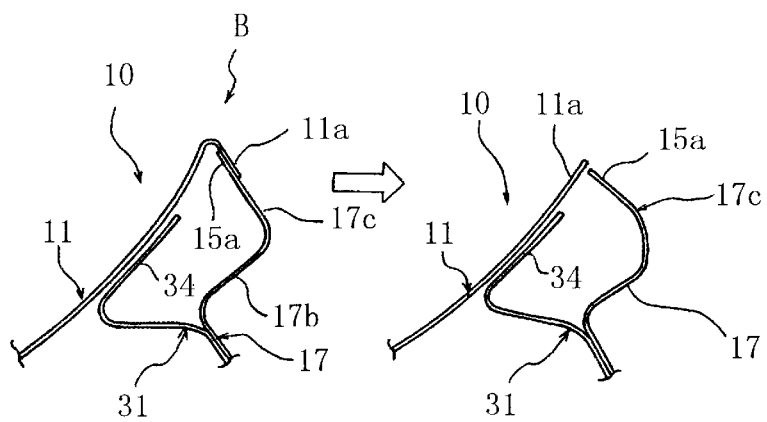

PRIOR ART

SIDE DOOR STRUCTURE FOR VEHICLE

BACKGROUND OF THE INVENTION

1. Field of the Invention

The present invention relates to a door for a vehicle, particularly to a side door structure for an automobile which prevents intrusion of the door into a passenger cabin in the case of a side collision.

2. Discussion of the Related Art

A side door for an automobile is provided to a car body part so as to be opened and shut by pivoting on a plurality of vertically spaced hinges. A door lock mechanism and is provided to assist in maintaining the door in a shut/closed condition.

The side door has an inner panel and an outer panel as essential structural components for providing strength to a door. A door lock mechanism and a window regulator are provided in a space between the inner panel and the outer panel. Furthermore, an impact beam of the side door is provided for a passenger's safety in a lengthwise direction of a vehicle in the space between the inner and outer panels. The impact beam functions as a reinforcement member for preventing the vehicle from intruding or protruding into the passenger cabin of the car when the door is deformed by receiving an impact load from the outer lateral side of the vehicle.

A side door with the impact beam is described in Japanese Kokai Publication 6 (1994)-255365. In the publication, a door structure has hinges and a vertical beam near the hinges, with a bottom end of the vertical beam extending beyond a bottom corner of a door opening. The vertical beam includes a top beam and a bottom beam respectively at upper and lower parts of the vertical beam. The top beam has a front part attached to a top end of the vertical beam and extends as downwardly inclining toward the rear part of the door. On the other hand, the bottom beam has a front part attached to a bottom end of the vertical beam and extends with an upward inclination toward the rear part of the door. Rear ends of the top beam and the bottom beam are fixed to have the rear ends at approximately the same height as that of a bracket surrounding a door lock mechanism.

When an impact load is applied to the top beam and/or the bottom beam from the outer lateral side of the door, the load is dispersed by being transmitted to a door opening frame member via the vertical beam and the bracket. Therefore, the intrusion of a part of the door into the passenger cabin is restricted, and the effect to a passenger sitting near the door is eliminated or minimized.

As shown in FIG. 9, Japanese Kokai Publication 9(1997)-86178 discloses a side door structure wherein a reinforcement member 112 with a U-shaped cross section is provided at a lower part at a door opening 111, and an impact beam 114 in a door main body 113 extends in a lengthwise direction. In the publication, it is proposed to provide the impact beam 114 at a position around the rear portion of the door main body so as to have a center line 114a of the impact beam 114 lower than the reinforcement member 112.

When an impact load is applied to the door main body 113 from the outer lateral side, the rear portion of the impact beam 114 is engaged into a lower part of the reinforcement member 112. In this configuration, it is possible to restrain the intrusion of a lower part of the main body 113, which would be caused by a large deformation of the lower part.

However, an impact load can be applied to the rear part of the door main body, that corresponds to a part relatively near to a passenger seated in the vehicle, from the outer lateral side. This happens relatively often due to the impact of another vehicle from the lateral side. In the side door structure disclosed in Japanese Kokai Publication 6 (1994)-255365, the rear part of the door main body may intrude into a cabin by the deformation of the lower part of the main body.

Moreover, the side door structure in Japanese Kokai Publication 9(1997)-86178 has the drawbacks that the shape of the door opening 111 is complex, and the internal structures contained in the door are revealed when the door is opened so as to mar/degrade the appearance. Furthermore, it is possible that an impact load is applied to the rear part of the door main body 113 at a portion above the rear end of the impact beam 114, namely at a relatively close position to a part where a passenger sits. In this case, the rear portion of the main body 113 can be deformed and intrude into the cabin.

OBJECT AND SUMMARY OF THE INVENTION

It is therefore a first object of the present invention to provide a side door structure of a vehicle which widely disperses a load applied to a door main body from the outer lateral side thereof to a rear part of the door main body and transmits the load to structural members of the vehicle body so as to prevent the intrusion of the door into a passenger cabin, to minimize an effect on a passenger sitting beside the door, and to restrain a local deformation of the door without marring the appearance of the door when the door is opened, which comprises a door main body with an inner panel provided to face an interior side of the vehicle and an outer panel provided as an exterior side of the vehicle, the inner panel having an inner panel peripheral part, the outer panel having an outer panel peripheral part, the inner panel opposed to the outer panel with the inner panel peripheral part connected with the outer panel peripheral part, the main body superimposed with a door opening frame member of the vehicle so as to have the door main body located on an outer side with respect to a vehicle width; and a rear side reinforcement member provided in the door main body and connecting the inner panel and the outer panel, the rear side reinforcement member, the inner panel and the outer panel defining a rigid part having a closed hollow cross section at a rear part of the door main body.

A second object of the present invention is to provide the side door structure which absorbs the impact energy applied from the outer lateral side of the side door even by the deformation of the rear-side reinforcement member, outer panel and inner panel so as to effectively prevent the intrusion of the door to the passenger cabin further comprising a impact beam provided in the door main body, the impact beam extending in a lengthwise direction of the vehicle and having a rear portion connected to the rear side reinforcement member.

A third object of the present invention is to provide the side door structure wherein the impact load is surely transmitted from the rear part of the door main body to the vehicle body with restricting the movement of the rear part of the door, wherein a front part of the door main body is supported on the door opening frame member by hinges connected therebetween, and a door lock mechanism provided in the door main body adjacent the rear side reinforcement member.

A fourth object of the present invention is to provide a side door structure which disperses a load applied to a door main body from an outer lateral side to a rear part of the door, transmits the load to a vehicle body structural member, absorbs the load even by the deformation of the rear reinforcement member, outer panel and inner panel when a strong impact load is applied so as to prevent the intrusion of the door into a passenger cabin and to minimize an effect on a passenger sitting beside the door without degrading the appearance of the door when the door is opened, comprising a main body formed of an inner panel provided to face at an interior side of the vehicle and an outer panel provided as an exterior side of the vehicle, the inner panel having an inner wall with a peripheral part, and a front face, a bottom face and a rear face formed by bending the inner panel in a direction toward the exterior side of the vehicle, the outer panel having an outer panel peripheral part, the inner panel opposed to the outer panel with the inner panel peripheral part connected with the outer panel peripheral part, the door main body superimposed with a door opening frame member of the vehicle so as to have the main body located on an outer side with respect to a vehicle width; and a rear side reinforcement member provided in the main body so as to face the rear face of the inner panel, the rear side reinforcement member connecting the inner panel and the outer panel, the rear side reinforcement member, the inner panel and the outer panel defining a rigid part with a closed hollow cross section at a rear portion of the door main body.

A fifth object of the present invention is to provide the side door structure which disperses an impact load applied to the main body from the lateral side thereof and widely transmits the impact load to vehicle body structural members even with the deformation of the structural members by preventing the application of a large load directly to a connecting part of the outer panel and the inner panel so as to restrict a rapid deformation of the structural members wherein the rear side reinforcement member comprises a base in the form of a band with an inner edge and an outer edge, the base provided so as to oppose the rear face of the inner panel; an inner flange formed along the inner edge by bending an extended portion from the base and connected to the inner wall of the inner panel; and an outer flange formed along the outer edge by bending an extended portion from the base and connected to the outer panel.

A sixth object of the present invention is to provide the side door structure for the side door with a beautiful external appearance by eliminating the distortion of the outer panel, wherein the outer flange is adhesively connected to the rear face of the outer panel.

A seventh object of the present invention is to provide the side door structure having a strong rear part and capable of effectively dispersing and absorbing impact energy, wherein the rear side reinforcement member comprises a connection part projected from the base and connected with the rear face of the inner panel.

An eighth object of the present invention is to provide the side door structure which effectively absorbs the impact load applied from the lateral side of the door by the deformation of the rear side reinforcement member, outer panel and inner panel by the transmission of the load from the impact beam to structural members of the vehicle body, further comprising a side door impact beam provided in the door, the side door impact beam having an impact beam rear portion and extending in a lengthwise direction of the vehicle, the impact beam rear portion connected to the rear side reinforcement member.

A ninth object of the present invention is to provide the side door structure which effectively transmits an impact load from the rear part of the door main body to structural members of the vehicle body for absorbing the impact energy, wherein the rear face of the inner panel contains an installation wall portion, a face at a lower portion of the outer flange contacted with the installation wall portion.

A tenth object of the present invention is to provide the side door structure capable of effectively preventing the vertical displacement of the rear part of the side-door impact beam by the load application, wherein the impact beam rear portion is connected to the rear side reinforcement member via a bracket which extends to cross in a longitudinal direction of the side door impact beam.

A eleventh object of the present invention is to provide the side door structure wherein the impact load is effectively transmitted from the rear part of the door main body to the structural members of the vehicle with restricting the movement of the rear part of the main body by the side door structure of a vehicle, wherein a front part of the door body is supported on the door opening frame member by the provision of hinges therebetween, and a door lock mechanism is provided in the door main body near the rear side reinforcement member.

BRIEF DESCRIPTION OF THE DRAWINGS

A more complete appreciation of the invention and many of the attendant advantages thereof that will be readily obtained thereby becomes better understood by reference to the following detailed description when considered in connection with the accompanying drawings, wherein:

FIGS. 7A and 7B are cross sections of a door main body for showing the deformation of the main body with a side door structure of the present invention when an impact load is applied to the door from the lateral side;

FIGS. 8A to 8D are cross sections of a door main body for explaining deformation stages of the main body when an impact load is applied to the door from the lateral side.

DETAILED DESCRIPTION OF THE INVENTION

Preferred embodiments of the side door structures of the present invention will now be explained by referring to figures, wherein the side door structure is applied to a rear door. In the figures, an arrow F indicates a forward direction with respect to a car body; an arrow OUT indicates an outer lateral side; and an arrow UP indicates an upward direction.

Figure 1:
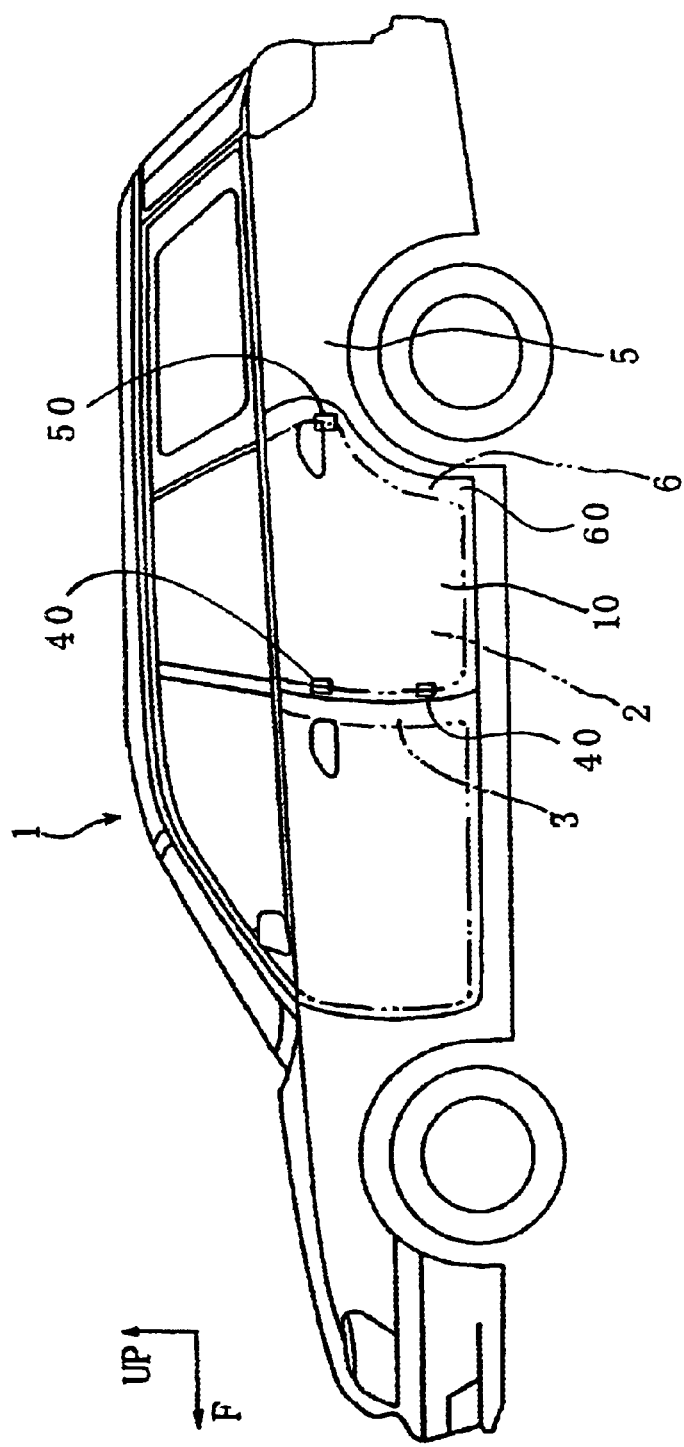
FIG. 1 is a side view of a car for explaining an outline of a side door structure according to the present invention.
Figure 2:
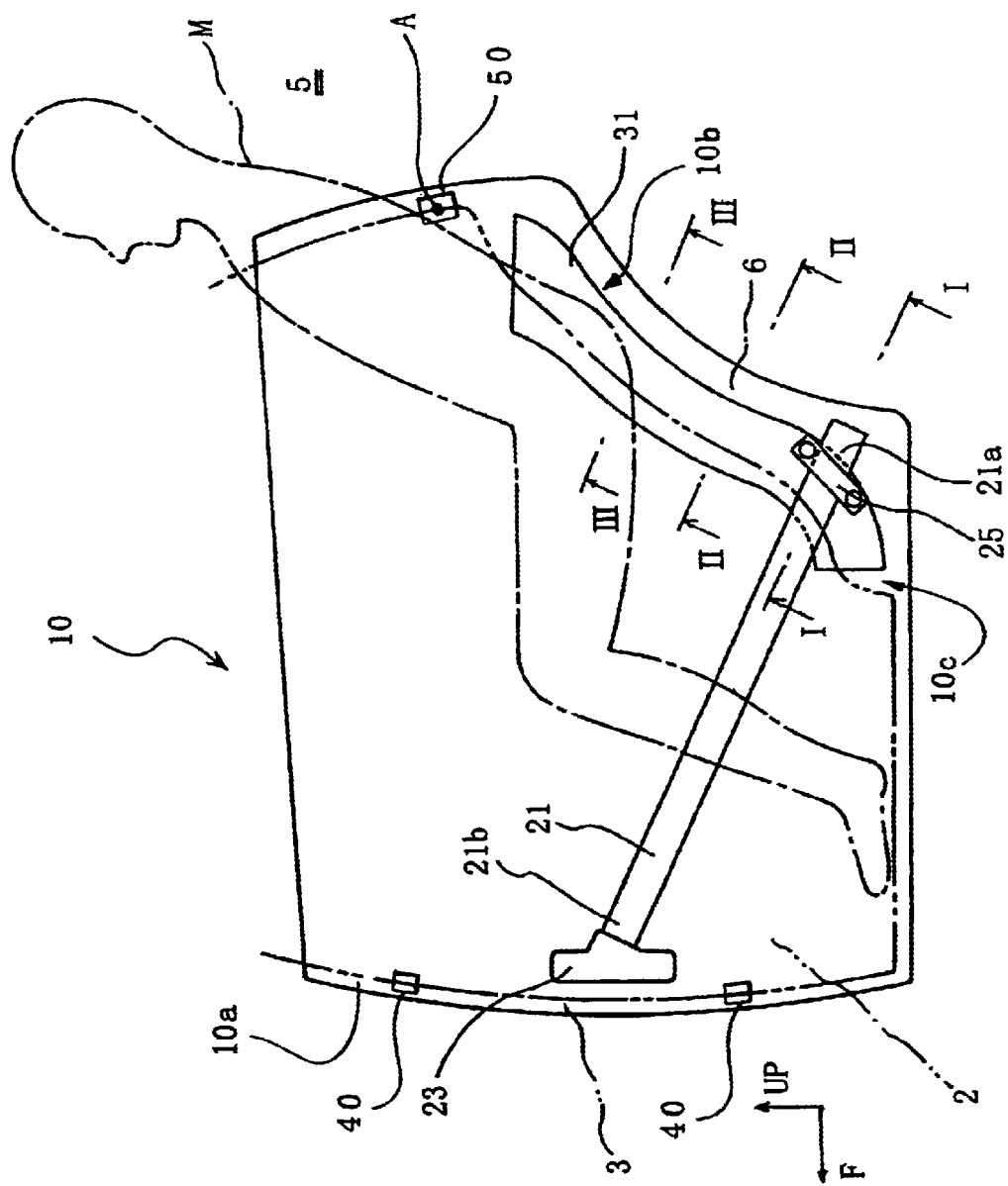
FIG. 2 is a side view of a car for showing a positional relationship between a main body with a side door structure of the present invention and a passenger sitting on a seat beside the door.

FIG. 1 is a side view of a car to which a side door structure of the present invention is applied, and FIG. 2 is a side view of a car for showing a positional relationship between a main body 10 of a rear door and a passenger M sitting on a seat beside the door.

The main body 10 of the rear door is supported in a door opening 2 which is formed on a lateral side of a car body 1. A rigid center pillar 3 is provided as a structural member to form the door opening 2, that is, a door opening member 60. A front part 10a of the main body 10 is supported by two hinges 40 vertically placed with a space therebetween and the main body 10 is linked with the center pillar 3. A rear part 10b of the main body 10 is supported by a door lock mechanism 50, which makes it possible to lock the door at a closed position. A rear bottom part of the door opening 2 is formed by a front part of a quarter panel 5 as a car structural member which is rigid. The quarter panel 5 is prepared so as to have a periphery 6 which is extended into a door opening 2. When the door is shut, the rear part 10b of the main body 10 is superimposed on the periphery 6 so as to have the rear part located on an outer side with respect to the car width.

In FIG. 2, a point A shows an engaging position of a ratchet of the door lock mechanism 50 on the main body 10 with a striker on the car body 1 when the door is closed.

Figure 3:
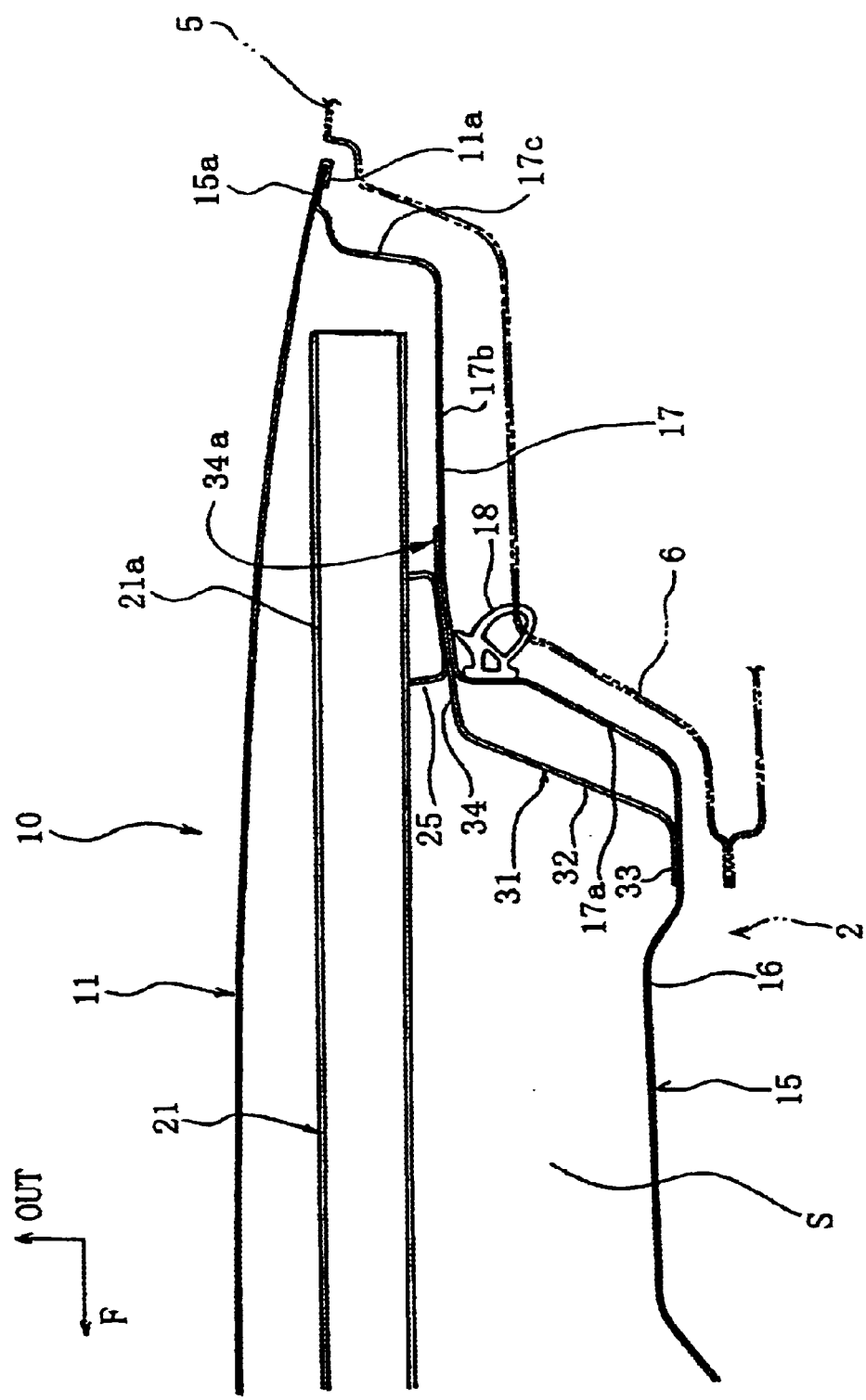
FIG. 3 is a cross section of a part shown in FIG. 2 cut along I—I.
Figure 4:
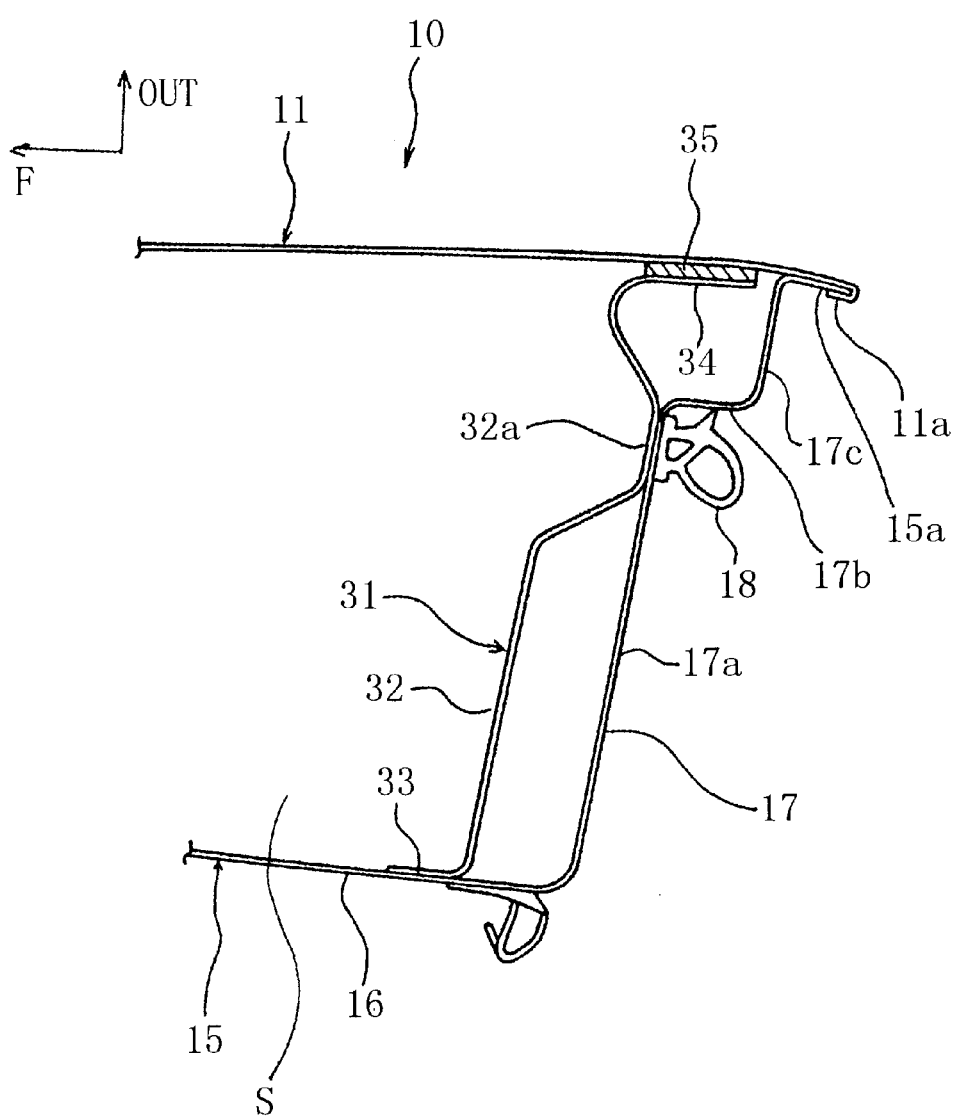
FIG. 4 is a cross section of a part shown in FIG. 2 cut along II—II.
Figure 5:
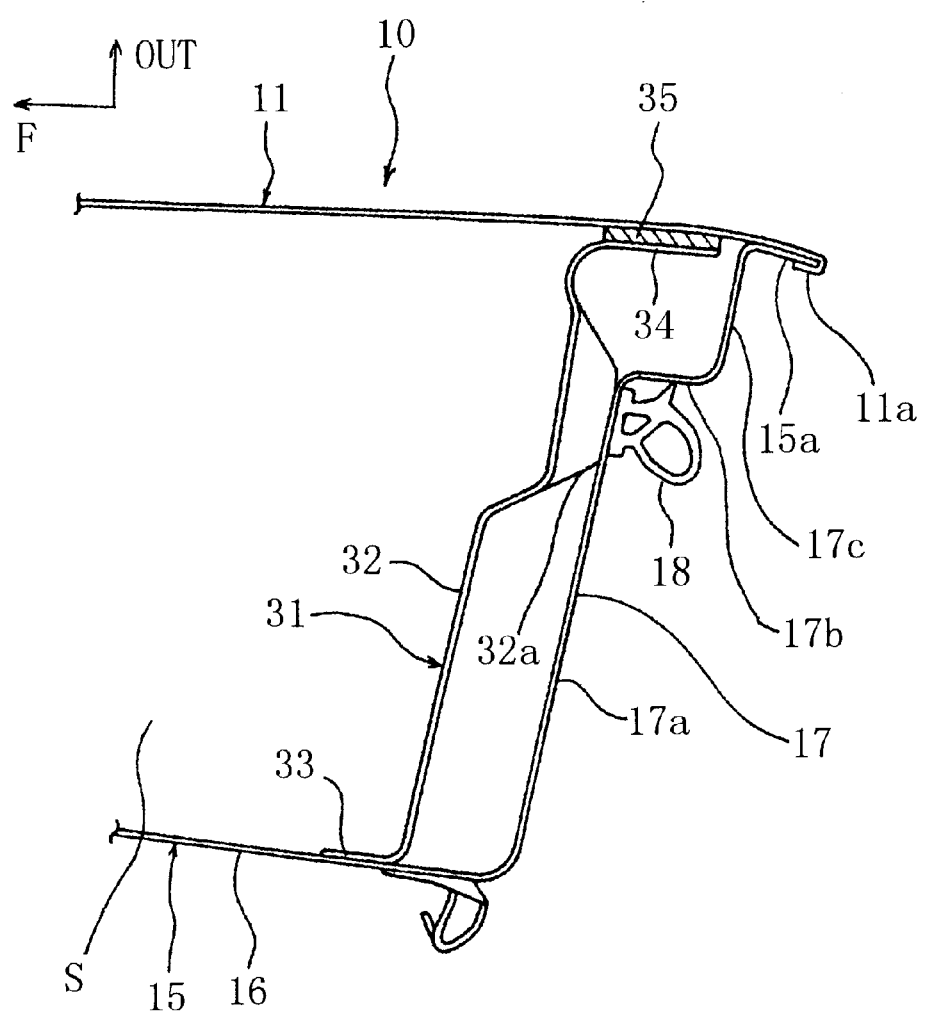
FIG. 5 is a cross section of a part shown in FIG. 2 cut along III—III.

As shown in FIGS. 3, 4 and 5, which are schematic cross sections cut along I—I, II—II and III—III in FIG. 2 respectively, the main body 10 is composed of an outer panel 11 in an approximately flat plate shape with a flange 11a formed along the outer periphery, and an inner panel 15.

The inner panel 15 has an inner wall 16, which is in an approximately plane shape and located in a passenger cabin side (inner side with respect to the car width). The inner wall 16 is surrounded by a front face and a bottom face (not shown) and a rear face 17 formed by bending parts extended from a front edge, bottom edge and rear edge of the inner part wall toward the outside of the car body. A flange 15a is prepared by bending over the entire periphery of the front face, the bottom face and the rear face 17. The thus formed inner panel 15 opposes an outer panel 11. The rear face 17 is formed by the provision of an inner part 17a, a center part 17b and an outer part 17c. The inner part 17a is formed by bending the inner panel 15 outwardly from the inner wall 16 in order to be conformable with a periphery 6 as a part of a quarter panel 5. The center part 17b is formed so as to oppose the outer panel 11 by bending the inner panel 15 in the backward direction at an inner edge of the inner part 17a. Further, the outer part 17c is formed by outwardly bending the inner panel 15 at a rear edge of the inner part 17a. The width of the center part 17b in a lengthwise direction of the car body is gradually decreased in an upper direction, thereby decreasing the width of the center part 17b to be superposed on the periphery 6.

The outer panel 11 and the inner wall 16 of the inner panel 15 are opposed with each other to contact a flange 15a of the inner panel 15 with a face of the outer panel 11. Then, a flange 11a of the outer panel 11 is bent so as to have the flange 15a of the inner panel 15 held by the flange 11a, and a space S is made by clinching the flanges 11a and 15a. Thus, the main body 10 with the space S is prepared. Moreover, a weather strip 18 ensures a waterproof property of the door by contacting the tip with the periphery 6 when the door is closed. The weather strip 18 is set along a boundary between the inner part 17a and the center part 17b.

A side door impact beam 21 is provided by the support of a front-side reinforcement member 23 and a rear side reinforcement member 31 in the space S formed by the outer panel 11 and the inner panel 15. A window glass (windshield), a door lock mechanism 50, and fittings such as a window regulator (not shown) are also contained in the space S, explanation of which is omitted since these do not have a direct relationship with the structure of the present invention.

As shown in FIG. 2, the impact beam 21 is made of an elongated hollow member extending along the inner face of the outer panel 11. The impact beam 21 extends so as to have a rear part 21a lower than a front part 21b. In other words, the impact beam 21 has a downward inclination. The front part 21b of the impact beam 21 is fixed to the front-side reinforcement member 23 which vertically extends near the hinges 40. Namely, the front part 21b of the impact beam 21 is fixed to a front part of the inner panel 11 by welding.

The impact beam 21 extends to have the rear part 21a near a lower rear corner of the main body 10 and reaches a part between an outer panel 11 and the above-mentioned center part 17b of inner panel 15. The rear part 21a is connected to the center part 17b of the inner panel 15 together with a rear side reinforcement member 31 by a bracket 25.

The bracket 25 has a U-shaped cross section and extends in a direction crossing the longitudinal direction of the impact beam 21. The bracket 25 and the rear side reinforcement member 31 contact with each other in large surfaces. By this configuration, it is possible to disperse the impact load applied from the impact beam 21 to a wide portion of the rear side reinforce member 31.

Figure 6:
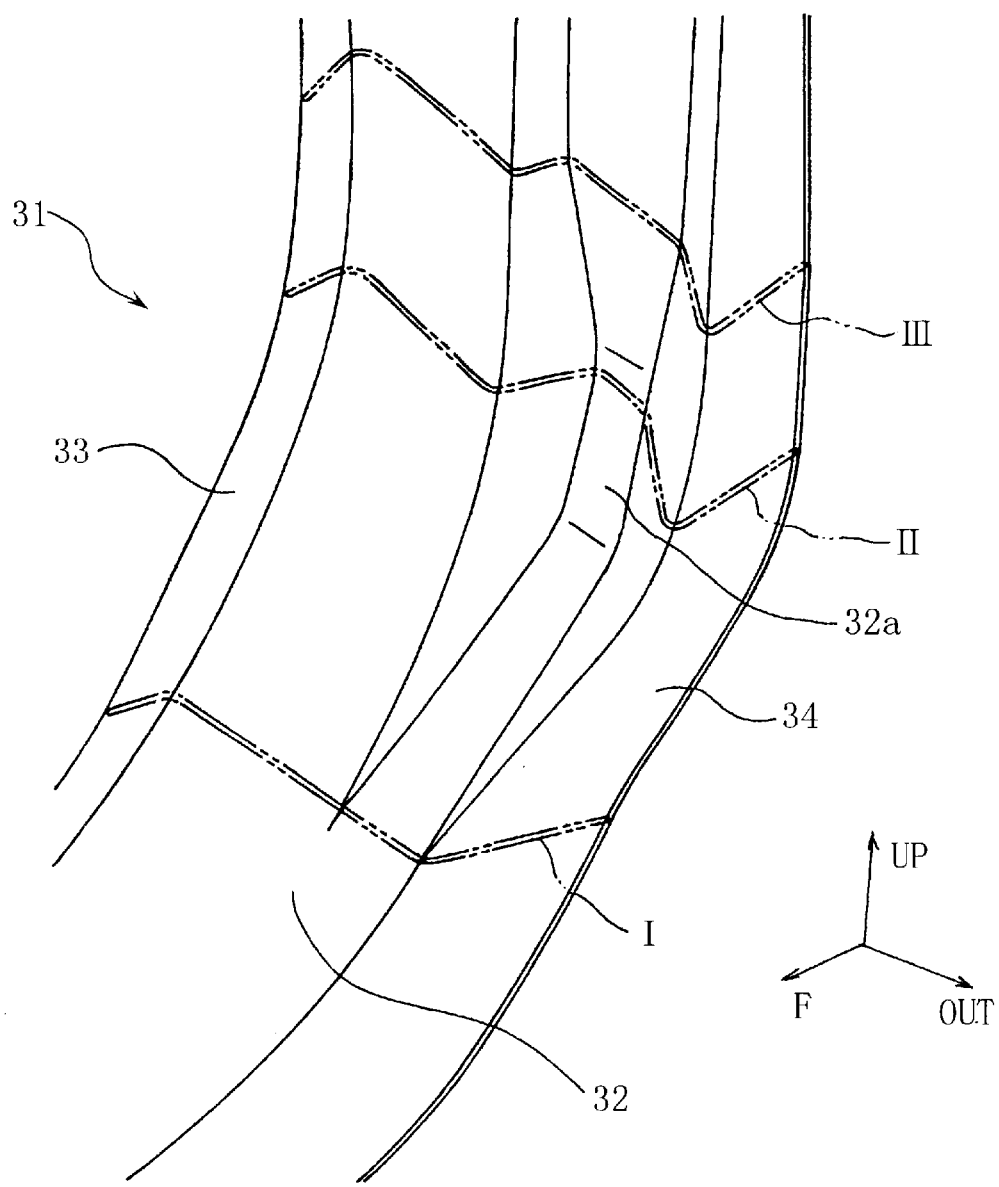
FIG. 6 is a perspective partial view of a rear side reinforcement member for use in the present invention.
Figure 9:
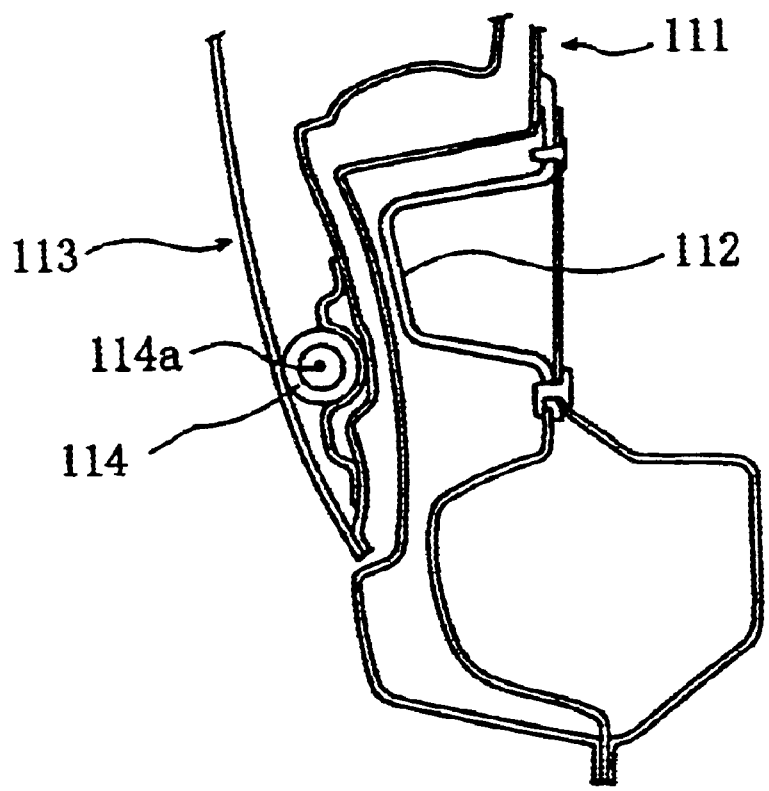
FIG. 9 illustrates a side door structure from the prior art.

The rear side reinforcement member 31 will be explained in detail with reference to FIGS. 2 to 6. As mentioned previously, a lower, middle and upper cross sections obtained by cutting along I—I, II—II and III—III lines in FIG. 2 are respectively shown in FIGS. 3 to 5. FIG. 6 is a perspective partial view of the rear side reinforcement member 31 and imaginary lines I, II and III are drawn correspondingly to the lines I—I, II—II and III—III in FIG. 2.

As shown in FIG. 2, the rear side reinforce member 31 is provided inside the main body 10 and extends along the edge of the periphery 6. The upper end of the rear side reinforcement member 31 is located near the lock mechanism 50, and the lower edge of the reinforcement member 31 reaches the lower edge of the main body 10. The rear side reinforcement member 31 has a shaped base 32 which opposes the rear face 17 of the inner panel 15, as shown in FIGS. 3 to 5. FIG. 3 shows that the lower part of the base 32 is laid over the inner wall 16 and the center part 17b of the rear face 17 and that the width of the base 32 at the lower part roughly corresponds to the distance from the inner wall to the center part 17b in a widthwise direction. At the middle part and the upper part of the rear reinforce member 31, as shown in FIGS. 4 and 5, the widths of the base 32, roughly corresponds to the distance between the inner wall 16 of the inner panel 15 and the outer panel 11 in a widthwise direction. In the middle part shown in FIG. 4, the reinforcement member 31 has a connection 32a which is backwardly and smoothly curved, and the connection 32a is contacted to a part of the inner part 17a near the center part 17b, and the faces of the connection 32a and the inner part 17a are linked by welding.

FIGS. 3 to 6 show that the base 32 has an inner flange 33 which is formed along an inner edge of the base 32 as a part bent toward the front side of the car body. The inner flange 33 is fixed to the inner wall 16 of the inner panel 15 by welding. The base 32 also has an outer flange 34 which is formed along an outer edge of the base as a part bent toward the rear side of the car body.

FIG. 3 shows that the lower part 34a of the outer flange 34 is connected to the center part 17b of the inner panel 15 by welding by way of a bracket 25. The bracket 25 has a U-shaped cross section, and is connected by welding to a part near the rear part 21a of the impact beam 21. The middle part and the upper part of the rear-part reinforce member 31 shown in FIGS. 4 and 5 are smoothly extended from the lower part in FIG. 3, and have the outer flange 34 connected to the outer panel 11 by an adhesive 35. Unlike fixation by welding, the fixation of the outer panel 11 and the rear side reinforcement member 31 by the adhesive eliminates an adverse effect to the appearance of the main body 10 without distorting the outer panel 11.

Accordingly, the rear side reinforcement member 31, the inner panel 15 and the outer panel 11 creates a rigid part with a closed hollow cross section, at the rear edge of the main body 10 extending from the bottom end thereof to a part near the door lock mechanism 50. The deformation of the rigid part is restricted by linking the connection 32a with the rear face 17 of the inner panel 15. Namely, the rigid part is widely formed along the rear edge of the main body 10 extending from a rear bottom part 10c (FIG. 2) of the door main body where the rear part 21a of the impact beam 21 is supported to the part near the door lock mechanism 50. The structure insures obtaining a rigid rear part of the main body 10.

The rear part of the main body 10 having the rigid part opposes the periphery 6 which is integral with the quarter panel 5 and is protruded to the inside of the door opening 2.

When an impact load is applied to the main body 10 from the outer lateral side, the impact load is transmitted to the center pillar 3 via the front-side reinforce member 23 connected to the front part 21b of the impact beam 21 and the hinges 40.

On the other hand, the impact load received on the lateral side of the main body 10 is transmitted to the rear part 21a of the impact beam 21, the bracket 25, and then widely to the strong rear part 10b of the main body 10 reinforced by the rigid part made by the rear side reinforcement member 31, the outer panel 11 and the inner panel 15. The load transmitted to the rear part of the door is widely distributed to the periphery 6. Namely, an impact load applied to the main body 10 with the side door structure of the present invention is distributed effectively to many structural members of the car body, whereby a local deformation of the main body 10 is largely restrained.

Here, the impact load applied to the impact beam 21 is effectively transmitted to the rigid part defined by the rear side reinforcement member 31, the inner panel 15 and the outer panel 11. This is because the outer flange 34 of the rear side reinforcement member 31 is fixed to the center part 17b of the rear face 17, and to the rear part 21a of the rear side impact beam 21.

Furthermore, the impact energy is absorbed by the deformation of the rear side reinforcement member 31, the outer panel 11 and the inner panel 15, so that it is possible to effectively prevent intrusion of a rear part 10b of the main body 10 into the passenger cabin. Consequently, the effect on a passenger sitting on the seat next to the main body 10 is eliminated or minimized.

In ordinary states, a ratchet of the door lock mechanism 50 provided on the main body 10 at the rear part 10b is engaged with a striker provided on the car body 1 when the door is closed. When an impact load is applied to the main body 10 from the outer lateral side, the rear part 10b of the main body 10 does not further move into the passenger cabin because of the engagement of the ratchet and the striker. The impact load is effectively transmitted from the rear part 10b of the main body 10 to the periphery 6.

Moreover, the side door structure of the present invention effectively prevents a vertical displacement of the rear part 21a of the impact beam 21 when an impact load is applied to the side door. This effect is obtained by the structure when the rear part 21a of the impact beam 21 is connected to the rear side reinforcement member 31 by way of the bracket 25 which extends in a direction crossing the longitudinal direction of the impact beam 21. It is possible to predict the transmission state of an impact load when the side door structure is used in this way. The impact load is transmitted from the rear part 21a of the impact beam 21 to a predetermined position by optionally changing the position of the rear side reinforcement member 31. As a result, it is possible to effectively construct a vehicle body by considering a load transmission.

FIGS. 7A and 7B are partial cross sections of a main body 10 for showing the deformation thereof. As mentioned previously, the outer flange 34 of the rear side reinforcement member 31 is fixed to the outer panel 11 by the adhesive 35, and the connection 32a of the rear side reinforcement member 31 is connected with the rear face 17 of the inner panel 15.

When an excessive impact load is applied to the main body 10 from the outer lateral side of the door, the outer panel 11, the inner panel 15 and the rear side reinforcement member could be largely deformed from the normal state shown in FIG. 7A to a deformed state shown in FIG. 7B. Even in the deformation process of the main body 10 with this structure, a clinch part B formed by the outer panel 11 and the inner panel 15 never receives a large load directly, although a shearing force approximately in a forward direction is applied to the adhered part by the deformation of the outer panel 11. Therefore, members are deformed with the clinching connection between the outer panel 11 and the inner panel 15 maintained, and the rigid part with a closed hollow cross section made by the outer panel 11, the inner panel 15 and the rear side reinforcement member 31 maintained. Accordingly, a rapid deformation process of each member is restricted by effectively absorbing the impact energy and sufficiently distributing the applied load.

FIGS. 8A to 8D are cross sections of a door main body for explaining deformation stages of a main body 10.

In FIG. 8A, the main body 10 has basically the same structure as that shown in FIGS. 4 and 5, except an outer flange 34 and an outer panel 11 are not linked by an adhesive. In this structure, impact energy applied to the main body 10 from the outer side is effectively absorbed by the structural members of the car body by the load being dispersed thereto. When an excessive load is applied to a rear part of the main body 10 with the structure of FIG. 8A from the outside, a direct impact load may be applied to a clinch part B at the rear edge of the outer panel 11 accompanied with a large deformation of the outer panel 11. In this case, the clinch part B could be raised up by bending to the front as shown in FIG. 8B, and the clinch part B formed by the flange 11a of the outer panel 11 and the flange 15a of the inner panel 15 could be opened, as shown in FIG. 8C. Finally the engagement between the flanges 11a and 15 would be lost as shown in FIG. 8D. Namely, it would be difficult to maintain the closed configuration formed by the outer panel 11, the inner panel 15 and the rear side reinforcement member 31 when the outer flange 34 is not linked with the outer panel 11 by an adhesive. In this configuration, the rigidity of the rear part of the main body 10 could be rapidly decreased, to effect energy absorption, or to hinder an effective dispersion of the load.

As a result, it is preferable that the side door structure has the outer flange 34 connected with the outer panel 11 by an adhesive, as explained above with reference to FIGS. 4 and 5.

As mentioned above, in the side door structure of the present invention, the main body 10 is provided with the rear side reinforcement member 31, and the rear side reinforce member 31, the main body 10, the outer panel 11, and the inner panel 15 form a rigid part with a closed hollow cross section at the rear part of the main body 10. Furthermore, the side door structure of the present invention further may have a side door impact beam 21 with the rear part 21a connected to the reinforcement member 31.

The side door structure of the present invention provides a passenger's safety by minimizing the possibility of the door intrusion into a passenger cabin. Moreover, since the rigid part is contained in the main body 10, the appearance of the inner surface of the door is never marred.

Thus, it is possible to prepare a side door structure which minimizes an impact effect on a passenger sitting beside the door without a large alternation of the design. Thus, the side door with the structure of the present invention is manufactured without increasing the cost.

In the above embodiments, only rear doors are used for the explanation of the side door structure of the present invention. Alternatively, it is possible to apply the side door structure to a front door.

Furthermore, it is possible to connect the outer flange 34 of the rear side reinforcement member 31 with the outer panel by a spot welding, instead of the connection by use of an adhesive. The welding, however, may effect the external appearance of the side door by the distortion. In such a case, it is preferable to take a further measure, for instance, to further provide a member for covering a distortion of the outer panel 11.

As mentioned previously, the side door structure of the present invention has a rear side reinforcement member 31 provided across the inner panel 15 and the outer panel 11 to prepare the rigid part with the closed hollow cross section at a rear part of a car. According to this configuration, the rear part of the door main body is prepared to be extremely rigid. Therefore, if an impact load is applied to the door main body from the outer lateral side, the impact load is effectively dispersed and is dispersed widely to the rear part of the door main body so as to eliminate a local distortion of the door main body. The impact load is then transmitted to the other structural members.

In the present invention, it is possible to absorb the impact load by the rear part reinforcement member, the outer panel and the inner panel, so that the intrusion of the main body into the passenger cabin is prevented.

Furthermore, the reinforcement member for use in the present invention is provided inside the door, so that the appearance of the door when the door is opened is not adversely affected.

The rear portion of the impact beam extending in a lengthwise direction of the vehicle body is connected to the rear side reinforcement member which is a member for forming the rigid part with the closed hollow cross section. In this case, it is possible to effectively disperse the impact load applied to the impact beam by transmitting the load to the other structural members via the rear part of the door main body. Thus, it is possible to prevent the main body from intruding to the passenger cabin.

The present invention being thus described, it will be clearly understood that the same may be varied in many ways. Such variations are not to be regarded as a departure from the spirit and scope of the present invention, and all such modification as would be easily understood to one skilled in the art are intended to be included within the scope of the appended claims.

What is claimed is:

1. A side door structure for a vehicle comprising:

a main body with an inner panel provided to face an interior side of said vehicle, an outer panel provided as an exterior side of said vehicle, a rear part and a rear bottom part, said inner panel having an inner panel peripheral part, said outer panel having an outer panel peripheral part, said inner panel opposed to said outer panel with said inner panel peripheral part connected with said outer panel peripheral part, said door main body superimposed with a door opening frame member of said vehicle so as to have said main body located on the exterior side with respect to a vehicle width; and a rear side reinforcement member provided in said main body and connecting said inner panel and said outer panel, said rear side reinforcement member extending along said rear part of said main body to said rear bottom part, said rear side reinforcement member, said inner panel and said outer panel defining a rigid part having a closed hollow cross section along said rear part of said main body.

2. The side door structure for the vehicle as claimed in claim 1, further comprising:

a side door impact beam provided in said main body extending in a lengthwise direction of said vehicle and having an impact beam rear part, said impact beam rear part connected to said rear side reinforcement member.

3. The side door structure for the vehicle as claimed in claim 2, wherein a front part of said main body is supported on said door opening frame member by hinges connected therebetween, and a door lock mechanism provided in said main body adjacent said rear side reinforcement member.

4. The side door structure for the vehicle as claimed in claim 1, wherein a front part of said main body is supported on said door opening frame member by hinges connected therebetween, and a door lock mechanism provided in said main body adjacent said rear side reinforcement member.

5. A side door structure for a vehicle comprising:

a main body formed of an inner panel provided to face at an interior side of said vehicle, an outer panel provided as an exterior side of said vehicle, a rear part and a rear bottom part, said inner panel having an inner wall with an inner panel peripheral part, and a rear face having a shape bent in a direction toward the exterior side of a vehicle body, said outer panel having an outer panel peripheral part, said inner panel opposed to said outer panel with said inner panel peripheral part connected with said outer panel peripheral part, said main body superimposed with a door opening frame member of said vehicle so as to have said main body located on the exterior side with respect to a vehicle width; and a rear side reinforcement member provided in said main body so as to face said rear face of said inner panel, said rear side reinforcement member connecting said inner panel and said outer panel, said rear side reinforcement member extending along said rear part of said main body to said rear bottom part, said rear side reinforcement member, said inner panel and said outer panel defining a rigid part with a closed hollow cross section along said rear part of said main body.

6. The side door structure for the vehicle as claimed in claim 5, wherein said rear side reinforcement member comprises:

a base part provided so as to oppose said rear face of said inner panel;

an inner flange extending from said base part and connected to said inner wall of said inner panel; and an outer flange extending from said base part and connected to said outer panel.

7. The side door structure for the vehicle as claimed in claim 6, wherein said outer flange is adhesively connected to said outer panel.

8. The side door structure for the vehicle as claimed in claim 7, wherein a front part of said main body is supported on said door opening frame member by the provision of hinges therebetween, and a door lock mechanism is provided in said main body near said rear side reinforcement member.

9. The side door structure for the vehicle as claimed in claim 7, wherein said rear side reinforcement member comprises a connection part projected from said base part and connected with said rear face of said inner panel.

10. The side door structure for the vehicle as claimed in claim 6, wherein said rear side reinforcement member comprises a connection part projected from said base part and connected with said rear face of said inner panel.

11. The side door structure for the vehicle as claimed in claim 10, further comprising:
    a side door impact beam provided in said main body and having an impact beam rear part and extending in a lengthwise direction of the vehicle body, said impact beam rear part connected to said rear side reinforcement member.

12. The side door structure for the vehicle as claimed in claim 6, wherein said rear face of said inner panel contains a center part, said outer flange has a lower part, said center part is overlaid on said lower part.

13. The side door structure for the vehicle as claimed in claim 6, wherein a front part of said main body is supported on said door opening frame member by the provision of hinges therebetween, and a door lock mechanism is provided in said main body near said rear side reinforcement member.

14. The side door structure for the vehicle as claimed in claim 6, further comprising:
    a side door impact beam provided in said main body and having an impact beam rear part and extending in a lengthwise direction of the vehicle body, said impact beam rear part connected to said rear side reinforcement member.

15. The side door structure for the vehicle as claimed in claim 14, wherein said impact beam rear part is connected to said rear side reinforcement member via a bracket which extends to cross a longitudinal direction of said side door impact beam.

16. The side door structure for the vehicle as claimed in claim 5, further comprising:
    a side door impact beam provided in said main body and having an impact beam rear part and extending in a lengthwise direction of the vehicle body, said impact beam rear part connected to said rear side reinforcement member.

17. The side door structure for the vehicle as claimed in claim 16, wherein said impact beam rear part is connected to said rear side reinforcement member via a bracket which extends to cross a longitudinal direction of said side door impact beam.

18. The side door structure for the vehicle as claimed in claim 5, wherein a front part of said main body is supported on said door opening frame member by the provision of hinges therebetween, and a door lock mechanism is provided in said main body near said rear side reinforcement member.

* * * * *